(12) United States Patent
Diffloth et al.

(10) Patent No.: US 12,095,813 B2
(45) Date of Patent: Sep. 17, 2024

(54) HOMOGLYPH ATTACK DETECTION

(71) Applicant: AT&T Intellectual Property I, L.P., Atlanta, GA (US)

(72) Inventors: Antoine Diffloth, Frisco, TX (US); Natalie Gilbert, Dallas, TX (US); Sundaresan Manoharan, Plano, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 516 days.

(21) Appl. No.: 17/380,677

(22) Filed: Jul. 20, 2021

(65) Prior Publication Data
US 2023/0028490 A1    Jan. 26, 2023

(51) Int. Cl.
*H04L 9/40*     (2022.01)
*G06F 18/2413*  (2023.01)
*G06N 3/04*     (2023.01)
*H04L 61/4511*  (2022.01)

(52) U.S. Cl.
CPC .... *H04L 63/1483* (2013.01); *G06F 18/24147* (2023.01); *G06N 3/04* (2013.01); *H04L 61/4511* (2022.05); *H04L 63/1416* (2013.01); *H04L 63/1425* (2013.01); *H04L 63/1475* (2013.01)

(58) Field of Classification Search
None
See application file for complete search history.

(56) References Cited

U.S. PATENT DOCUMENTS

2019/0019058 A1*  1/2019  Woodbridge ........ G06V 10/768
2020/0228500 A1*  7/2020  Olumofin .............. G06F 40/30

OTHER PUBLICATIONS

Klensin, "RFC 5890," Internet Engineering Task Force (IETF), Aug. 2010, 33 pages.
Klensin, "RFC 5891," Internet Engineering Task Force (IETF), Aug. 2010, 25 pages.
Faltstrom, "RFC 5892," Internet Engineering Task Force (IETF), Aug. 2010, 99 pages.
Alvestrand et al., "RFC 5893," Internet Engineering Task Force (IETF), Aug. 2010, 25 pages.
Klensin, "RFC 5894," Internet Engineering Task Force (IETF), Aug. 2010, 61 pages.

(Continued)

*Primary Examiner* — Syed A Roni
(74) *Attorney, Agent, or Firm* — Guntin & Gust, PLC; Atanu Das

(57) ABSTRACT

The described technology is generally directed towards homoglyph attack detection. A homoglyph attack detection service can create images of customer's protected domain names. A convolutional neural network can generate feature vectors based on the images. The feature vectors can be stored in a similarity search data store. Newly observed domain names can be compared to the customer's protected domain names, by also generating feature vectors for the newly observed domain names and conducting approximate nearest neighbor searches. Search results can be further evaluated by comparing protected domain names to newly observed domain names using a siamese neural network which applies a similarity threshold. Newly observed domain names that meet or exceed the similarity threshold can be flagged for further action.

20 Claims, 10 Drawing Sheets

(56) References Cited

OTHER PUBLICATIONS

"Internationalized domain name," Wikipedia, https://en.wikipedia.org/wiki/Internationalized_domain_name, accessed Jul. 19, 2021, 14 pages.
"IDN homograph attack," Wikipedia, http://en.wikipedia.org/wiki/IDN_homograph_attack, accessed Jul. 19, 2021, 12 pages.
Woodbridge et al., "Detecting Homoglyph Attacks with a Siamese Neural Network," arXiv:1805.09738v1 [cs.CR] May 24, 2018, 7 pages.

* cited by examiner

HOMOGLYPH ATTACK DETECTION

TECHNICAL FIELD

The subject application is related to internet security, e.g., to prevention of homoglyph attacks that make use of visually similar website domain names.

BACKGROUND

Homoglyphs are characters that are visually similar to other characters, e.g., 0 and O (digit zero and capital letter O). In one example homoglyph attack, the attacker registers a domain name that appears visually similar to a legitimate website. For example, the attacker may register g00g1e.com, which is visually similar to google.com. The attacker may then build a malicious website at g00g1e.com, which may appear identical to the legitimate website at google.com. Among other features, g00g1e.com may include a link to log in, which loads a page including username and password fields.

The attacker may then send spam emails to many unsuspecting internet users, some of whom may click a link in the email which opens g00g1e.com. Furthermore, some internet users may attempt to log into g00g1e.com, by entering their username and password, thinking they are logging into google.com. By entering their access credentials, such users unwittingly give the attacker the information needed to log into the user's account at google.com, thereby potentially giving the attacker access to sensitive information.

The above described homoglyph attack is a "phishing" type attack. Other homoglyph attacks are also possible, and can be used to steal access credentials, credit card information, or various other information. In general, a homoglyph attack is any attack that uses a similar looking domain name to trick users into accessing and/or using a website other than the intended website.

Opportunities for homoglyph attacks have expanded dramatically. With the adoption of internationalized domain names, domain names can utilize ~143,000 Unicode characters, rather than the 37 ASCII characters previously allowed. While this huge expansion of the characters available for use in domain names promotes the global adoption of internet usage, especially in areas where the Latin ASCII character set is not native, this change also vastly expands the set of confusable characters that can be used by attackers to perform homoglyph attacks.

Moreover, some of the Unicode characters are visually indistinguishable, which also makes homoglyph attacks more powerful. For example, a careful internet user may closely examine the domain name in the address bar of their browser, and find that it accurately reads as, e.g., apple.com, when in fact the website they have accessed is not apple.com owned by Apple Computers of Cupertino, CA Unicode includes both the Latin letter p and a Cyrillic p, which are different Unicode characters that are nonetheless visually identical to the human eye. As a result, apple.com using a Cyrillic p is a different domain than apple.com using a Latin p, and these different domains can potentially by owned separately and can direct to different websites.

Companies can make efforts to prevent or otherwise address homoglyph attacks. Some companies register confusingly similar domain names themselves, to thereby make the confusingly similar domain names unavailable to other registrants. Confusingly similar domain names can also be reported to various legal and technical groups, which can take action to thwart their use. However, new homoglyph attacks can occur anytime and addressing them quickly is preferable, to protect sensitive data as well as to prevent reputational damage to the owners of trusted websites. There is a need in the industry for more powerful detection of potential homoglyph attacks.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
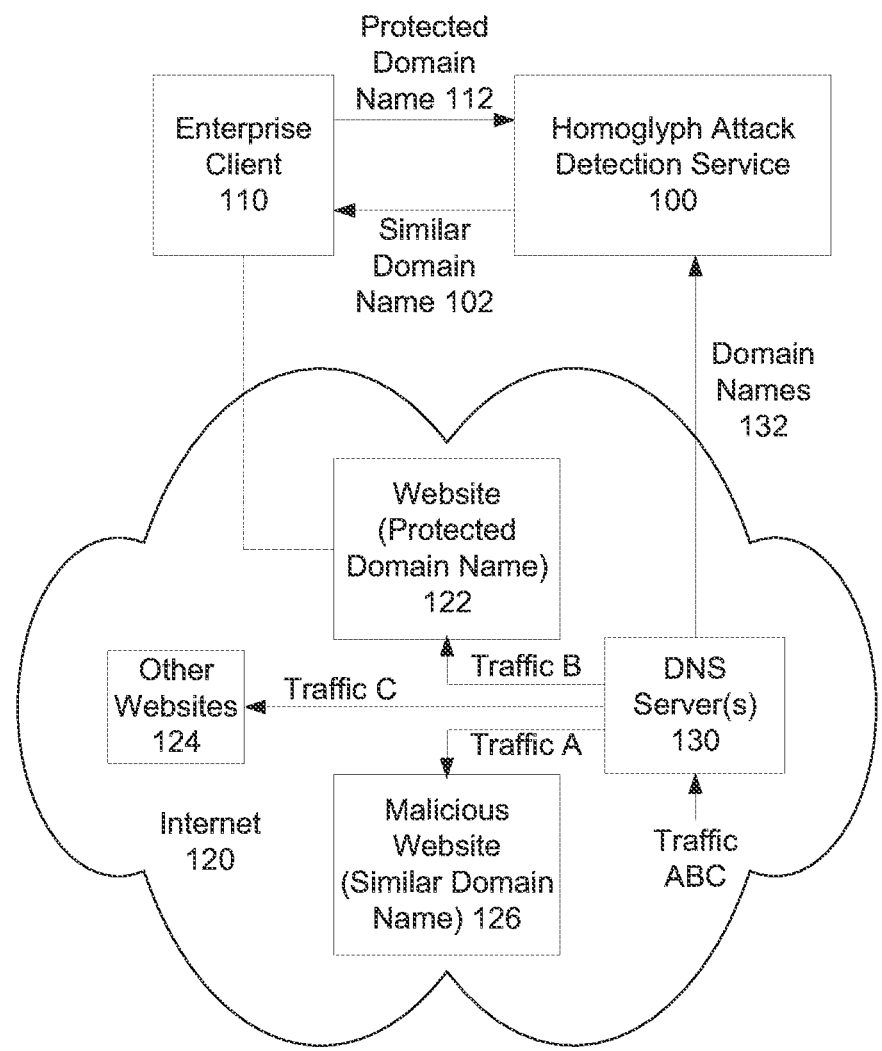
FIG. 1 illustrates an example homoglyph attack detection service, along with other components with which the homoglyph attack detection service can interact, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards homoglyph attack detection. In some examples, a homoglyph attack detection service can create images of customer's protected domain names. A convolutional neural network can then be applied to generate feature vectors based on the images. The feature vectors can be stored in a similarity search data store. Newly observed domain names can then be compared to the customer's protected domain names, by also generating feature vectors for the newly observed domain names, and conducting approximate nearest neighbor searches of the similarity search data store. Search results can be further evaluated, e.g., by comparing protected domain names to newly observed domain names using a siamese neural network which applies a similarity threshold. Newly observed domain names that meet or exceed the similarity threshold can be flagged for further review or action.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

FIG. 1 illustrates an example homoglyph attack detection service, along with other components with which the homoglyph attack detection service can interact, in accordance with various aspects and embodiments of the subject disclosure. FIG. 1 includes a homoglyph attack detection service 100, an enterprise client 110, and the Internet 120. The Internet 120 includes example domain name service (DNS) server(s) 130, and example websites. The example websites include a website 122 which is associated with a protected domain name 112 owned by enterprise client 110, a malicious website 126 which uses a similar domain name, similar to the protected domain name 112, and various other websites 124. All of the elements illustrated in FIG. 1 can be implemented by one or more computing devices.

In FIG. 1, the enterprise client 110 can be a customer of the homoglyph attack detection service 100. As such, the enterprise client 110 can provide protected domain name 112 to the homoglyph attack detection service 100, and the enterprise client 110 can direct homoglyph attack detection service 100 to identify domain names which are confusingly similar to protected domain name 112, i.e., potential homoglyph attacks. In some embodiments, the homoglyph attack detection service 100 can be separate from the DNS server(s) 130, as illustrated in FIG. 1. In other embodiments, the server(s) 130 homoglyph attack detection service 100 can be integrated into the DNS server(s) 130, e.g., in order to provide a feature for a protective DNS. DNS server(s) 130 can optionally be provided by an internet service provider (ISP), or any other entity that hosts DNS server(s) 130.

Example operations of the homoglyph attack detection service 100 are described in detail in connection with FIGS. 2-9. In general, in a first phase, the homoglyph attack detection service 100 can be configured to create an image of the protected domain name 112 and generate a feature vector based on the image. The homoglyph attack detection service 100 can store the feature vector in a similarity search data store. The homoglyph attack detection service 100 can repeat the first phase each time the homoglyph attack detection service 100 adds a domain name to be protected.

A second phase of operations by the homoglyph attack detection service 100 can be configured to run periodically, e.g., daily. In the second phase, the homoglyph attack detection service 100 can be configured to obtain domain names 132 from DNS server(s) 130. Domain names 132 can comprise domain names observed by the DNS server(s) 130 while handling internet traffic. Internet traffic can include, e.g., traffic ABC, which includes traffic A having a domain name for malicious website 126, traffic B having a domain name for protected website 122, and traffic C having domain names for other websites 124. The full set of domain names observed by DNS server(s) 130 can be very large, and either the DNS server(s) 130 or the homoglyph attack detection service 100 can be configured to reduce the full set of observed domain names, so that the homoglyph attack detection service 100 can analyze a limited set of comparison domain names, such as "newly observed" domain names.

The homoglyph attack detection service 100 can be configured to create images of the comparison domain names and generate feature vectors based on the images. The homoglyph attack detection service 100 can then conduct approximate nearest neighbor searches in the similarity search data store, using the feature vectors generated from the comparison domain names as search inputs, in order to identify approximate nearest neighbors of the comparison domain names. The identified approximate nearest neighbors include feature vectors associated with protected domain names which are the most visually similar to a given comparison domain name.

Next, in order to determine if identified "nearest neighbor" protected domain names are in fact confusingly similar to a comparison domain name, the homoglyph attack detection service 100 can use, e.g., a siamese neural network to compare each identified protected domain name included in approximate nearest neighbor search results with a corresponding comparison domain name used as a search input. The siamese neural network can apply a tunable similarity threshold, such as 85% (this is an example only and any desired similarity threshold can be used) when comparing feature vectors. If any identified protected domain names meet or exceed the similarity threshold with respect to a comparison domain name, then the comparison domain name can be flagged for further review and/or action to prevent a homoglyph attack on the similar protected domain name.

Figure 2:
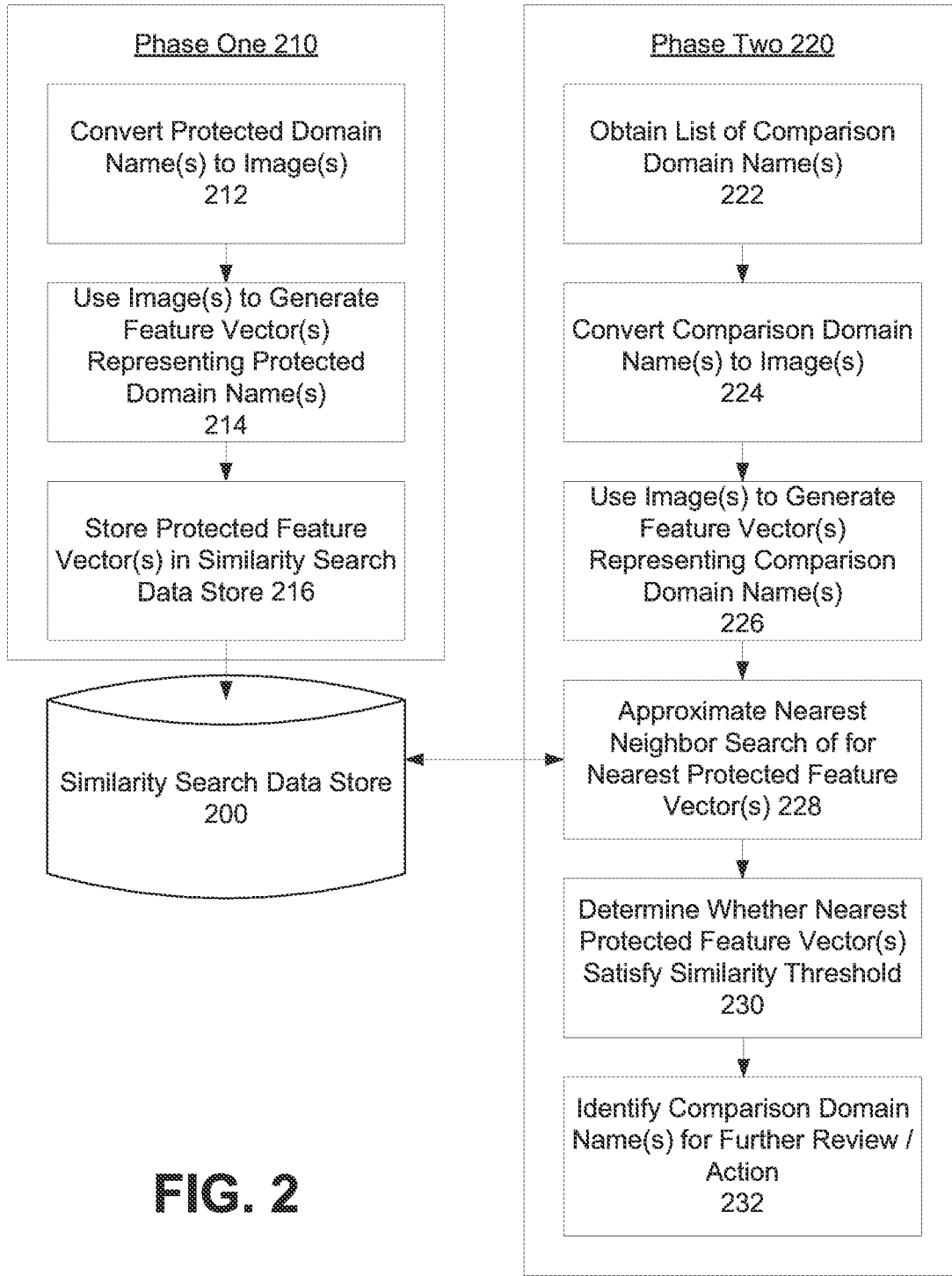
FIG. 2 provides an example overview homoglyph attack detection service operations, wherein the operations are divided into two phases, in accordance with various aspects and embodiments of the subject disclosure.

FIG. 2 provides an example overview of homoglyph attack detection service operations, wherein the operations are divided into two phases, in accordance with various aspects and embodiments of the subject disclosure. FIG. 2 includes similarity search store 200, phase one 210, and phase two 220, wherein phase one 210 and phase two 220 each include example operations which can be implemented by the homoglyph attack detection service 100 introduced in FIG. 1.

The operations of phase one 210 generally relate to intake of new protected domain names, such as protected domain name 112, from customers, and configuring the homoglyph attack detection service 100 to include the protected domain name 112 in its phase two 220 operations. Phase one 210 can be conducted each time a new protected domain name 112 is added to the homoglyph attack detection service 100. Phase one 210 includes "convert protected domain name(s) to image(s)" 212, "use image(s) to generate feature vector(s) representing protected domain names(s)" 214, and "store protected feature vector(s) in similarity search data store" 216.

The operations of phase two 220 generally relate to checking observed domain names, e.g., domain names 132 in FIG. 1, for potential homoglyph attacks against the protected domain names acquired during phase one 210. Phase two 220 can be conducted repetitively, optionally according to a periodic interval such as daily, twice daily, weekly, twice weekly, etc. In an embodiment, the interval between phase two 220 cycles can match the time period used for the purpose of identifying "newly observed" domain names, as described further with reference to FIG. 4. Phase two 220 includes "obtain list of comparison domain name(s)" 222, "convert comparison domain name(s) to image(s)" 224, "use image(s) to generate feature vector(s) representing comparison domain name(s)" 226, "approximate nearest neighbor search for nearest protected feature vector(s) 228, "determine whether nearest protected feature vector(s) satisfy similarity threshold" 230, and "identify comparison domain name(s) for further review/action" 232.

In FIG. 2, "convert protected domain name(s) to image(s)" 212 and "convert comparison domain name(s) to image(s)" 224 can comprise similar or identical processing of protected domain name(s) for operation 212, and comparison domain name(s) for operation 224. Prior to image generation, a font fallback procedure can be applied to a domain name. The font fallback procedure can, e.g., initially attempt to render a domain name in a default font. However, the default font may not include/recognize all the characters of some domain names, resulting in a missing space or an otherwise incorrectly rendered character. In response to detection of an unrecognized character, the font fallback procedure can "fall back" or switch to a first different font the unrecognized character. If the character is also not recognized by the first different font, then the font fallback procedure can "fall back" or switch to a second different font for that character, and so on until the character is recognized. The same procedure can be followed for any other unrecognized characters, until all characters of a domain name are recognized characters. As a result, a set of fonts, comprising multiple different fonts, can potentially be applied to a single domain name. By applying a same font fallback procedure at operations 212 and 224, visual differences in domain names due to font selection are reduced. In some embodiments, a font fallback procedure can employ font substitution to simulate heterogeneous end user environments.

Subsequent to the font fallback procedure, operations 212 and 224 can proceed with image generation using any image generation technique. Image generation can produce image data, such as a file or other image data, comprising an image of the domain name. The image data, if embodied in a file, can be in an image file format, such as a joint photographic experts group (JPEG) format, or any other format. The image data can optionally be black and white, e.g. with a black domain name image on a white background, although other colors can be used in other embodiments.

Furthermore, "use image(s) to generate feature vector(s) representing protected domain names(s)" 214 and "use image(s) to generate feature vector(s) representing comparison domain name(s)" 226 can comprise similar or identical processing of images produced via operations 212 and 224, respectively. In some embodiments, a same pre-trained convolutional neural network can be used at operations 214 and 226. The pre-trained convolutional neural network can be configured to generate high-dimensional feature vectors, e.g. feature vectors having 60,000 elements or more. In some embodiments, high-dimensional feature vectors can have around 100,000 elements. A feature vector can comprise a series of numbers that can be used as a "fingerprint" for an image.

The pre-trained convolutional neural network can comprise a deep learning mechanism used for feature extraction. The pre-trained convolutional neural network represents a complex structure (in this case an image) as a feature vector. By using a pre-trained convolutional neural network, embodiments can overcome the lack of labeled training data—there are not many curated, verified lists of homograph attack domains, and those that exist are not representative of future attacks. Synthetically generated training data can lead to bias towards detecting only other synthetically generated examples. In contrast, a pre-trained convolutional neural network can be trained on other data prior to use in connection with domain names as described herein.

In some embodiments, the pre-trained convolutional neural network can operate by passing convolutional filters over an image. Successive layers can encode larger features of the image. Feature extraction maps a complex input space (an image) to a lower dimensional output space (a feature vector), which can provide a basis for image similarity search.

Transfer learning is the use of large neural networks that have been pre-trained. For the pre-trained convolutional neural network, this can mean training on an ImageNet or other proprietary image collection. Pre-trained convolutional neural networks are trained to extract visual features from images and have been very successfully generalized to applications beyond the training data set. The benefit of transfer learning is that the neural network architecture has already been designed and validated, the training and validation data has been labeled, and the extensive compute required for training has already been done.

At "store protected feature vector(s) in similarity search data store" 216, the homoglyph attack detection service 100 can store feature vector outputs from operation 214 in the similarity search data store 200. The similarity search data store 200 can index data stored therein in a manner that allows efficient comparisons across many dimensions. A variety of similarity search database models and algorithms are available and any available technology can be used to implement the similarity search data store 200.

In some examples, similarity search data store 200 can be designed to solve the problem of finding the point in n-dimensional space that is closest to a given input point. Similarity search data store 200 can be tree-based, using e.g., a k-d tree (a binary tree where every leaf node is a single point, and every non-leaf node is a split) a random projection tree, or another tree structure. Similarity search data store 200 can also be hashing-based, and can use, e.g., locally sensitive hashing (LSH), principal component analysis (PCA) hashing, or other hashing techniques. Similarity search data store 200 can optionally use libraries such as FACEBOOK® Faiss, GOOGLE® ScaNN, OR SPOTIFY® ANNOY. Methods like word2vec and convolutional neural nets can convert many data modalities (text, images, users, items, etc.) into numerical vectors, such that pairwise distance computations on the vectors correspond to semantic similarity of the original data. Similarity search data store 200 can find nearest neighbors by aggregating results from an ensemble of random projection trees with each constructed recursively through a series of carefully chosen random projections.

At "obtain list of comparison domain name(s)" 222, the homoglyph attack detection service 100 can obtain comparison domain names for comparison against the protected domain names stored in the similarity search data store 200. In an embodiment, the homoglyph attack detection service 100 can be configured to receive domain names 132 from DNS server(s) 130 as illustrated in FIG. 1. However, this disclosure is not limited to any particular source of obtained domain names. Furthermore, obtaining a list of comparison domain names at 222 can comprise processing received domain names in order to produce a limited set of comparison domain names, as described further in connection with FIG. 4.

At "approximate nearest neighbor search for nearest protected feature vector(s) 228, the homoglyph attack detection service 100 can apply any approximate nearest neighbor search algorithm to search the similarity search data store 200 to identify nearest neighbors of each feature vector generated at operation 226. The search results can be limited to any desired number, e.g., the nearest 1, 2, 3 . . . 10, . . . neighbors can be identified. However, a "nearest" neighbor is not necessarily a very close neighbor. In the present context, a "nearest" neighbor is not necessarily associated with a protected domain name that is confusingly similar to a comparison domain name. For this reason, operation 230 can be included in some embodiments, in order to determine whether identified nearest neighbors are sufficiently similar to indicate a potential homoglyph attack.

At "determine whether nearest protected feature vector(s) satisfy similarity threshold" 230, the homoglyph attack detection service 100 can further compare feature vectors generated at operation 226 with nearest neighbor feature vectors returned as search results at operation 228, in order to determine whether any of the search results satisfy a similarity threshold. In some embodiments, operation 230 can employ a siamese neural network and a tunable similarity threshold. The tunable similarity threshold can be set to any desired similarity, e.g., 90%. A feature vector for a comparison domain name and a feature vector for a protected domain name can be provided as inputs to the siamese neural network. The siamese neural network can output a yes/no output indicating whether there is the threshold similarity between the inputs. If the siamese neural network generates a "no", then no further action is necessary. If the siamese neural network generates a "yes", then the inputs to the siamese neural network can be provide to operation 232.

At "identify comparison domain name(s) for further review/action" 232, the homoglyph attack detection service 100 can take any of a variety of further actions. In some embodiments, the homoglyph attack detection service 100 can store and/or send an output for human review. The output can comprise, e.g., a protected domain name and a comparison domain name that met the similarity threshold at operation 230. In some embodiments, the homoglyph attack detection service 100 can automatically initiate a blacklist, sinkhole, or uniform domain name dispute resolution policy (UDRP) process. To blacklist a comparison domain name, the suspected malicious domain can be published to lists that are shared in the cybersecurity community. To sinkhole a comparison domain name, domain name service providers can be requested to not reply to requests for malicious domains. To initiate a UDRP process, a notification can be sent to an appropriate operation center.

Figure 3:
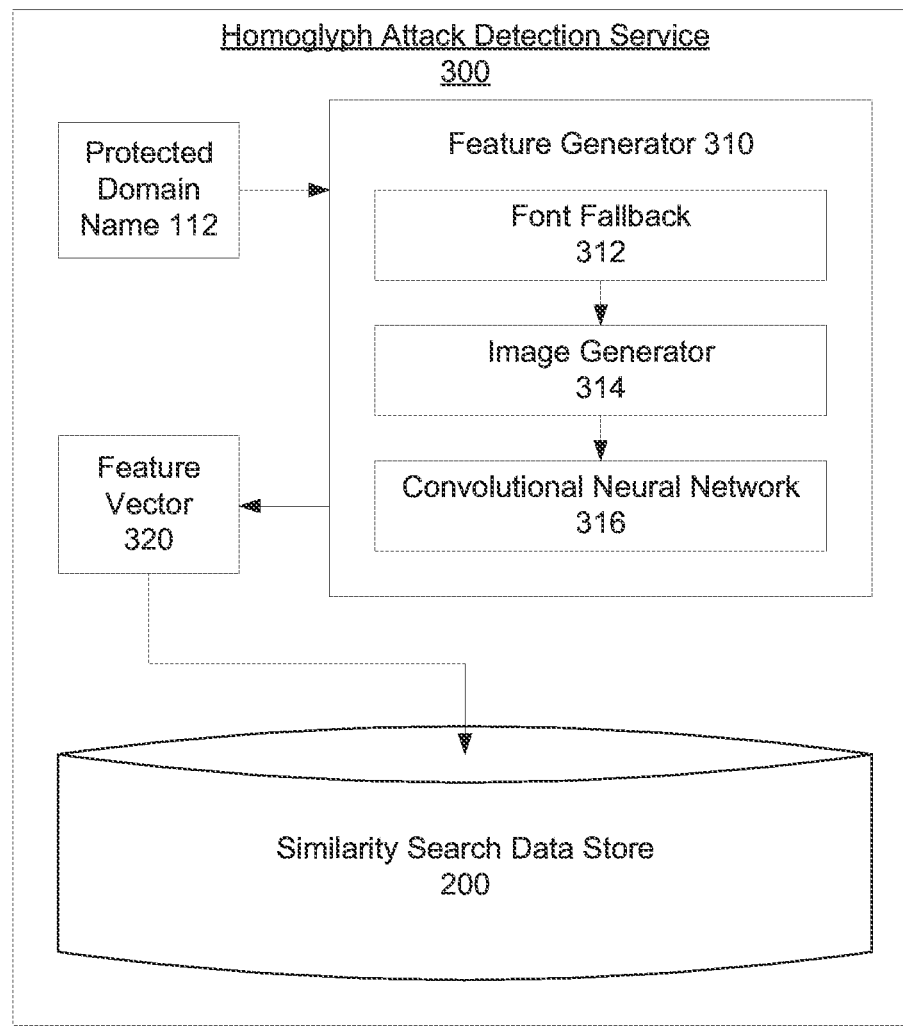
FIG. 3 illustrates example aspects of a homoglyph attack detection service which can implement a first phase of homoglyph attack detection service operations, in accordance with various aspects and embodiments of the subject disclosure.
Figure 5:
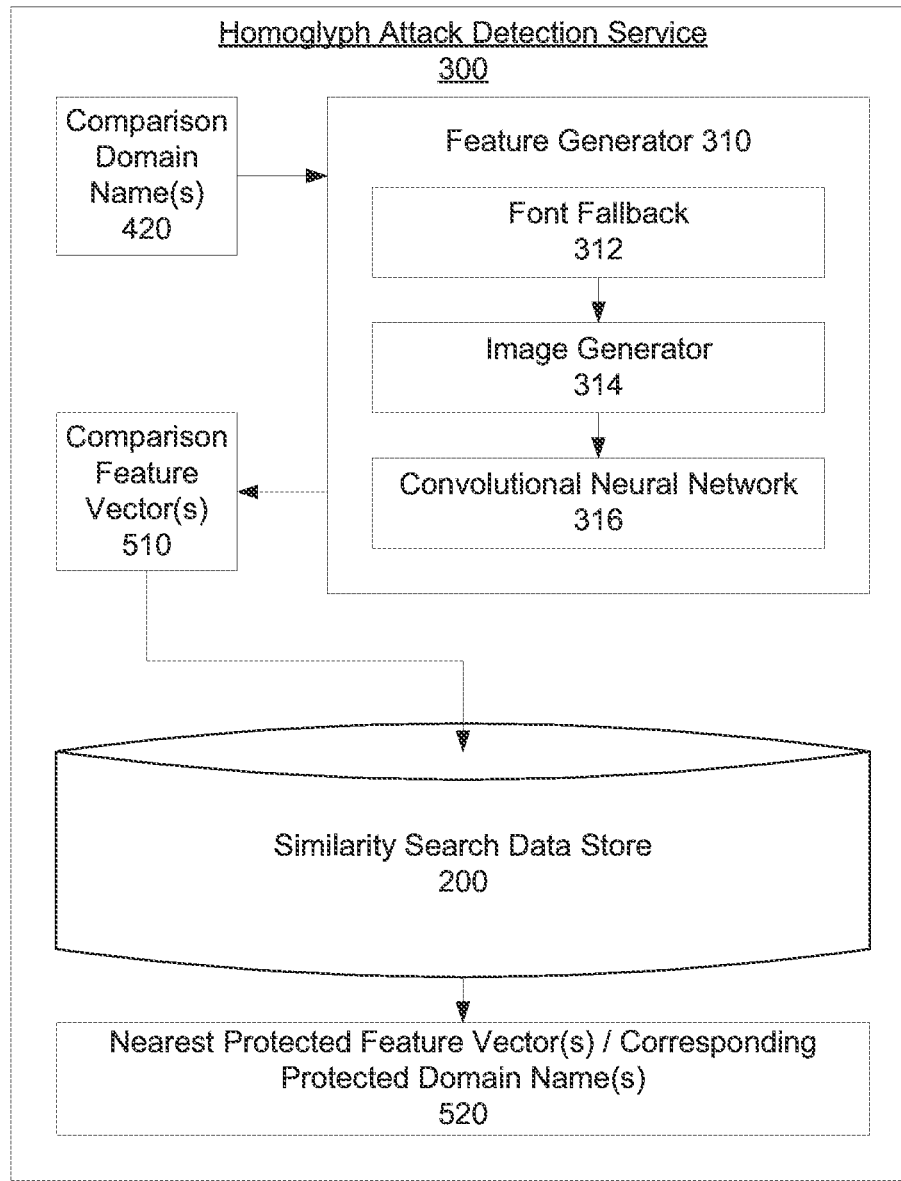
FIG. 5 illustrates example aspects of a homoglyph attack detection service which can implement identification of nearest neighbors during the second phase of homoglyph attack detection service operations, in accordance with various aspects and embodiments of the subject disclosure.
Figure 6:
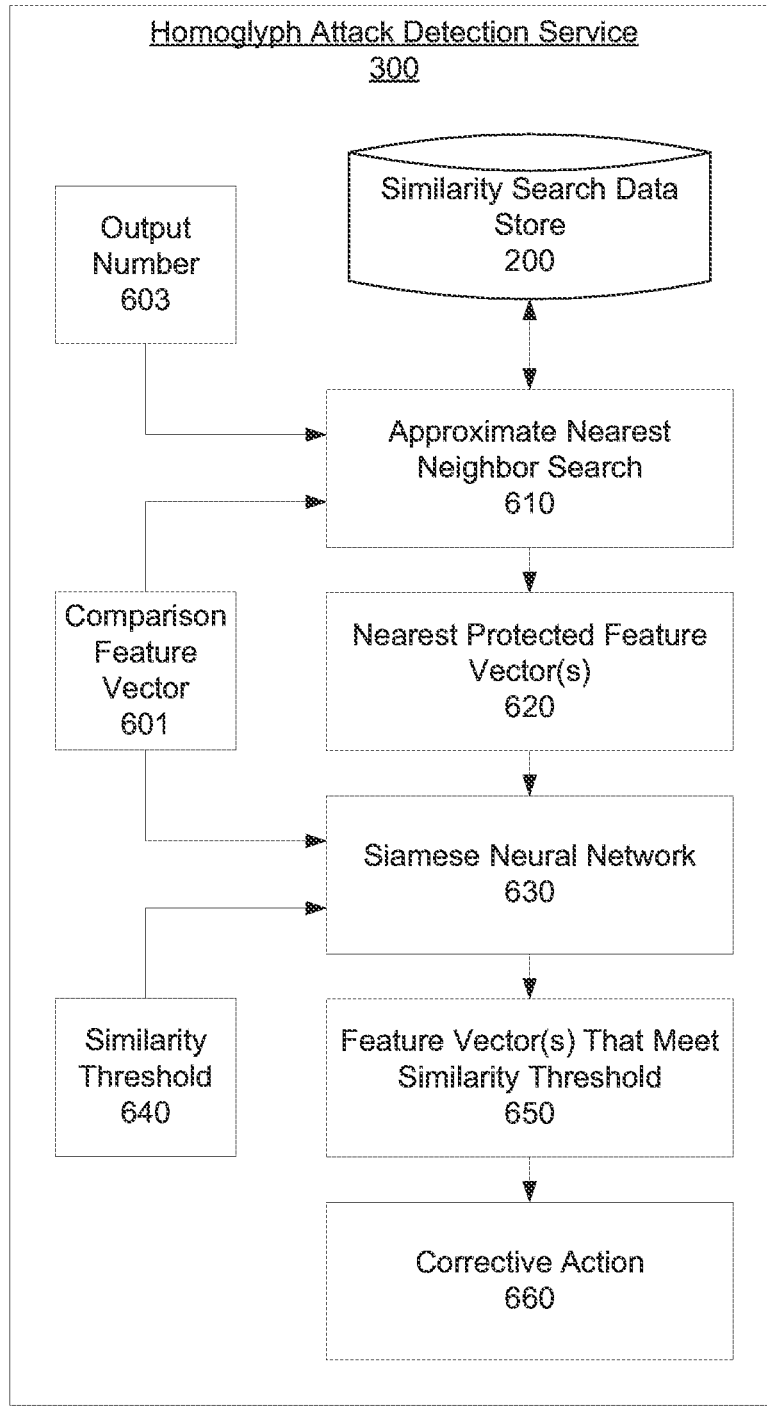
FIG. 6 illustrates example aspects of a homoglyph attack detection service which can implement identification of confusingly similar domain names during the second phase of homoglyph attack detection service operations, in accordance with various aspects and embodiments of the subject disclosure.

FIG. 3 illustrates example aspects of a homoglyph attack detection service which can implement a first phase of homoglyph attack detection service operations, in accordance with various aspects and embodiments of the subject disclosure. FIG. 3 illustrates aspects of an example homoglyph attack detection service 300 which implement the phase one 210 functions discussed with reference to FIG. 2. Further aspects of the example homoglyph attack detection service 300 are illustrated in FIG. 4, FIG. 5, and FIG. 6.

The example homoglyph attack detection service 300 comprises the protected domain name 112, a feature generator 310, a feature vector 320, and the similarity search data store 200. The feature generator 310 includes font fallback 312, image generator 314, and convolutional neural network 316.

In an example operation of the homoglyph attack detection service 300, the received protected domain name 112 can be processed by feature generator 310. First, font fallback 312 can be used to ensure all characters of the protected domain name 112 are rendered, as described in connection with FIG. 2. Next, image generator 314 can convert the protected domain name 112 into image data. Finally, convolutional neural network 316 can generate the feature vector 320 based on the image data. The homoglyph attack detection service 300 can then index the feature vector 320 in the similarity search data store 200. The homoglyph attack detection service 300 can also store relation information that relates the feature vector 320 to the associated protected domain name 112 and the associated image data generated by image generator 314.

Figure 4:
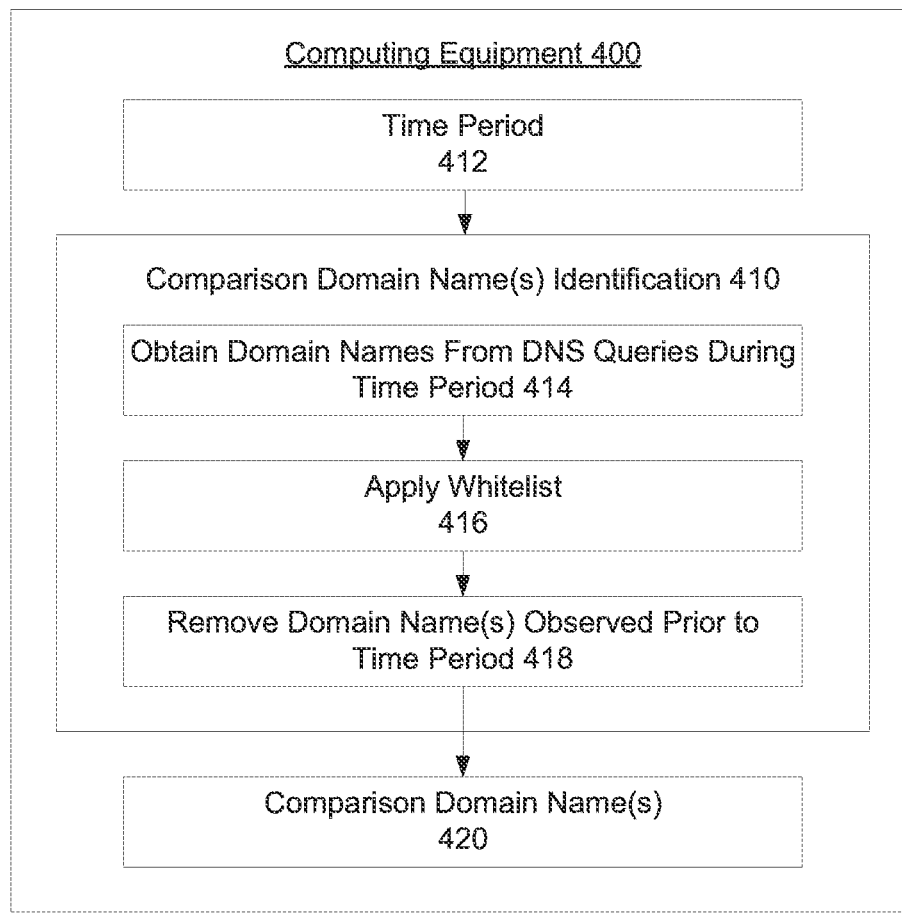
FIG. 4 illustrates example aspects of a homoglyph attack detection service which can implement obtaining a list of comparison domain names during a second phase of homoglyph attack detection service operations, in accordance with various aspects and embodiments of the subject disclosure.

FIG. 4 illustrates example aspects of a homoglyph attack detection service which can implement obtaining a list of comparison domain names during a second phase of homoglyph attack detection service operations, in accordance with various aspects and embodiments of the subject disclosure. FIG. 4 illustrates computing equipment 400, wherein the computing equipment 400 and the illustrated functions can be included/integrated with the homoglyph attack detection service 300 in some embodiments. In other embodiments, the computing equipment 400 can be included, e.g., at DNS server(s) 130. The computing equipment 400 can implement part of the homoglyph attack detection service 300 introduced in FIG. 3, namely, the "obtain list of comparison domain name(s)" 222 function discussed with reference to FIG. 2.

In FIG. 4, the computing equipment 400 includes a time period 412 which is provided to comparison domain name(s) identification 410, and a comparison domain name(s) 420 output generated by the comparison domain name(s) identification 410. Comparison domain name(s) identification 410 includes operations 414-418 that can be repeated according to a repeat interval, such as daily.

At 414, the computing equipment 400 can be configured to obtain domain names from DNS queries during the time period 412. For example, if the time period 412 is one day, the computing equipment 400 can obtain, e.g., from DNS server(s) 130, a list of all domain names observed in DNS queries during a one day time period immediately preceding the time at which operation 414 is performed.

At 416, the computing equipment 400 can be configured to apply a whitelist, e.g., a list of domain names that are always removed. The computing equipment 400 can scan the domain names obtained at operation 414, and remove therefrom any domain names listed on a whitelist.

At 418, the computing equipment 400 can be configured to remove domain name(s) observed prior to the time period 412. For example, the computing equipment 400 can maintain a list of all domain names observed by the computing equipment 400 prior to the one day time period 412 which immediately precedes operation 414. The computing equipment 400 can scan the domain names obtained at operation 414, as modified at operation 416, and remove therefrom any domain names that are identified on the list of domain name(s) observed prior to the time period. The output of operation 418 can comprise the comparison domain name(s) 420, which can be compared against protected domain names in a subsequent portion of phase two 220 operations.

FIG. 5 illustrates example aspects of a homoglyph attack detection service which can implement identification of nearest neighbors during the second phase of homoglyph attack detection service operations, in accordance with various aspects and embodiments of the subject disclosure. FIG. 5 illustrates aspects of an example homoglyph attack detection service 300 which implement phase two 220 functions discussed with reference to FIG. 2. Further aspects of the example homoglyph attack detection service 300 are illustrated in FIG. 3, FIG. 4, and FIG. 6.

The example homoglyph attack detection service 300 comprises the comparison domain name(s) 420 introduced in FIG. 4, the feature generator 310 introduced in FIG. 3, comparison feature vector(s) 510, the similarity search data store 200 introduced in FIG. 2, and nearest protected feature vector(s)/corresponding protected domain name(s) 520. The feature generator 310 includes font fallback 312, image generator 314, and convolutional neural network 316, described in connection with FIG. 3.

In an example operation of the homoglyph attack detection service 300, the comparison domain name(s) 420 can be processed by feature generator 310. First, font fallback 312 is used to ensure all characters of the comparison domain name(s) 420 are rendered, as described in connection with FIG. 2. Next, image generator 314 converts the comparison domain name(s) 420 into image data. Finally, convolutional neural network 316 generates the comparison feature vector(s) 510 based on the image data. The homoglyph attack detection service 300 can then conduct approximate nearest neighbor searches of the similarity search data store 200 using comparison feature vector(s) 510 as search/lookup inputs.

The search/lookup results from the approximate nearest neighbor searches of the similarity search data store 200 can include nearest protected feature vector(s)/corresponding protected domain name(s) 520. For a given comparison feature vector from comparison feature vector(s) 510, an approximate nearest neighbor search of the similarity search data store 200 can yield a unique set of search results. The unique set of search results can comprise a predetermined number of protected feature vectors, e.g., 1-10 protected feature vectors, which are the closest matches to the given comparison feature vector used as the search input. The unique set of feature vector search results, and optionally the corresponding protected domain names as well as the given comparison feature vector used as the search input, can be output/stored as nearest protected feature vector(s)/corresponding protected domain name(s) 520. In some embodiments, nearest protected feature vector(s)/corresponding protected domain name(s) 520 can include multiple data sets, each data set comprising a different comparison feature vector search input and its corresponding search results.

FIG. 6 illustrates example aspects of a homoglyph attack detection service which can implement identification of confusingly similar domain names during the second phase of homoglyph attack detection service operations, in accordance with various aspects and embodiments of the subject disclosure. FIG. 6 illustrates aspects of an example homoglyph attack detection service 300 which implement phase two 220 functions discussed with reference to FIG. 2. Further aspects of the example homoglyph attack detection service 300 are illustrated in FIG. 3, FIG. 4, and FIG. 5.

The example homoglyph attack detection service 300 comprises a comparison feature vector 601, an output number 603, the similarity search data store 200 introduced in FIG. 2, approximate nearest neighbor search 610, nearest protected feature vector(s) 620, siamese neural network 630, similarity threshold 640, feature vectors that meet the similarity threshold 650, and corrective action 660.

In FIG. 6, the comparison feature vector 601 can comprise a comparison feature vector from comparison feature vector(s) 510, illustrated in FIG. 5. The output number 603 can comprise a configurable number of desired search outputs for approximate nearest neighbor searches. Approximate nearest neighbor search 610 can use the comparison feature vector 601 and the output number 603 as a search/lookup inputs, applicable in conjunction with an approximate nearest neighbor search process or algorithm, to lookup protected feature vectors in the similarity search data store 200. The output of the approximate nearest neighbor search 610 can comprise nearest protected feature vector(s) 620, i.e., an output number 603 of protected feature vector(s) from the similarity search data store 200, comprising the protected feature vector(s) which are nearest/most similar to the comparison feature vector 601.

The homoglyph attack detection service 300 can perform one or more comparisons using the siamese neural network 630. In an example, the siamese neural network 630 can comprise two or more identical sub-networks, each having a same architecture, parameters, and weights. Parameter updates are mirrored across the sub-networks. Siamese neural networks can generally be used for verification, rather than classification.

For each comparison performed by siamese neural network 630, the comparison feature vector 601 can be compared with a different nearest protected feature vector from nearest protected feature vector(s) 620, in order to determine whether the input feature vectors meet a configurable similarity threshold 640. An output of the siamese neural network 630 can comprise feature vector(s) that meet the similarity threshold 650, e.g., pairs of feature vectors comprising the comparison feature vector 601 and any protected feature vector that meets or exceeds the similarity threshold 640. The homoglyph attack detection service 300 can process the feature vector(s) that meet the similarity threshold 650 using corrective action 660, wherein corrective action 660 can implement the operations described in connection with "identify comparison domain name(s) for further review/action" 232 described with reference to FIG. 2.

Figure 7:
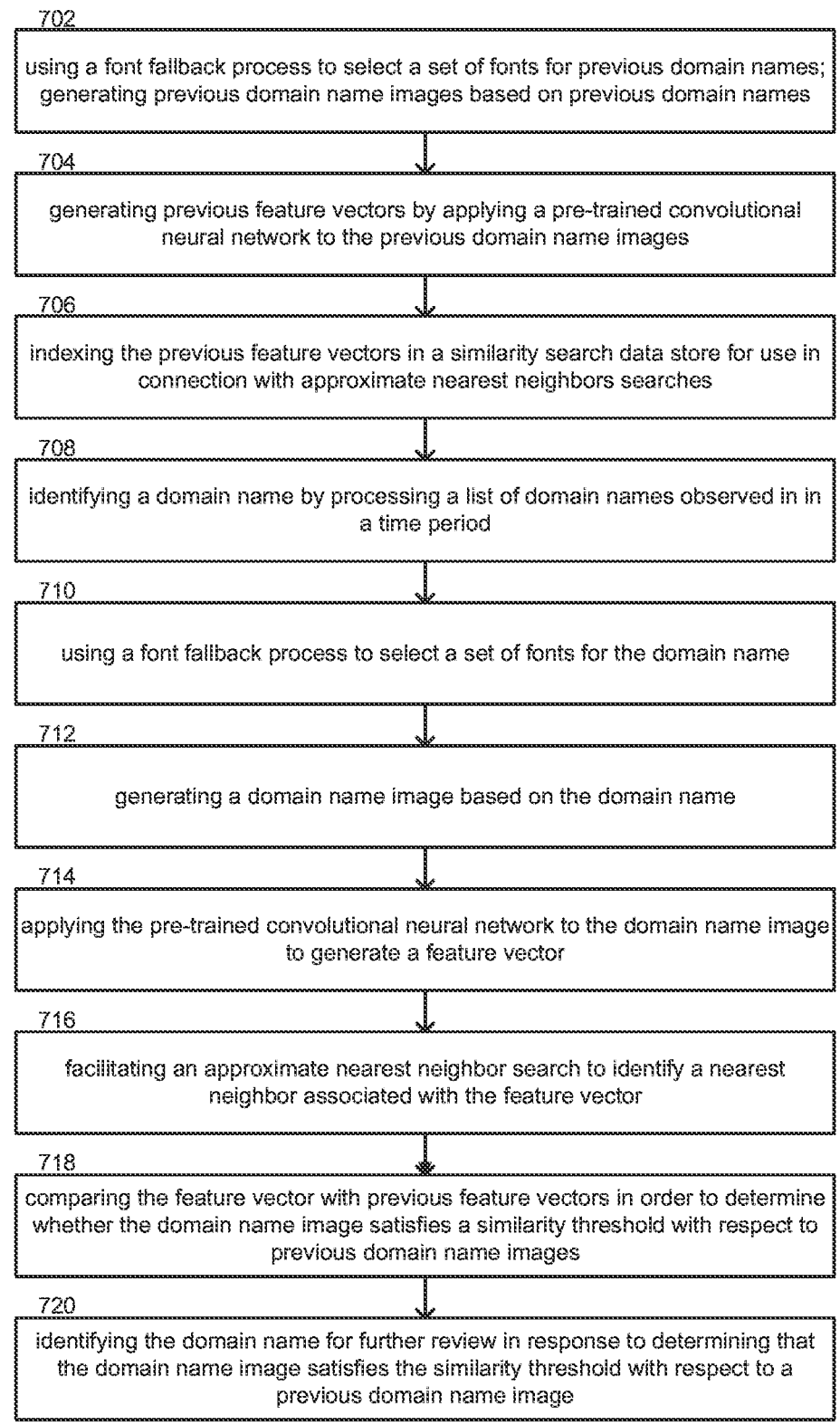
FIG. 7 is a flow diagram representing example operations of a homoglyph attack detection service, in accordance with various aspects and embodiments of the subject disclosure.

FIG. 7 is a flow diagram representing example operations of a homoglyph attack detection service, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by the homoglyph attack detection service 300 illustrated in FIGS. 3-6. Operations 702-706 generally implement phase one 210 illustrated in FIG. 2. At 702, the feature generator 310 illustrated in FIG. 3 can optionally use a font fallback process to select a set of fonts for previous domain names, and then generate previous domain name images based on previous domain names. Here, the previous domain name images are the images generated during phase one 210, namely, images of protected domain names such as 112. At 704, the feature generator 310 can generate previous feature vectors, such as feature vector 320, by applying a pre-trained convolutional neural network to the previous domain name images. At 706, the homoglyph attack detection service 300 can index the previous feature vectors, such as feature vector 320, in a similarity search data store 200 for use in connection with approximate nearest neighbor searches.

Operations 708-720 generally implement phase two 220 illustrated in FIG. 2. At 708, the homoglyph attack detection service 300 can identify a domain name, e.g., a comparison domain name 420, by processing a list of domain names observed in in a time period. Processing the list of domain names observed in the time period can comprise, e.g., removing, from the list of domain names observed in the time period, domain names observed prior to the time period. In some embodiments, the list of domain names observed in the time period can comprise at least substantially all domain names observed in domain name system queries processed via a domain name service provider network in the time period. Further aspects related to identifying a domain name, which can optionally be included in operations according to FIG. 7, are described in connection with FIG. 4.

At 710, the feature generator 310 illustrated in FIG. 5 can use a font fallback process to select a set of fonts for the domain name 420 identified at operation 708. At 712, the feature generator 310 can generate a domain name image based on the domain name 420. At 714, the feature generator 310 can apply a pre-trained convolutional neural network to the domain name image to generate a feature vector, e.g., a comparison feature vector 601 of comparison feature vectors 510.

At 716, the homoglyph attack detection service 300 can facilitate an approximate nearest neighbor search 610 to identify a nearest neighbor associated with the feature vector 601. The nearest neighbor can comprise a previous feature vector associated with a previous domain name image generated prior to the domain name image, e.g., the nearest neighbor can comprise a previous feature vector generated during phase one 210, at operation 704. In some embodiments, the approximate nearest neighbor search 610 can identify a group of nearest neighbors 620 associated with the feature vector 601. The nearest neighbors in the group of nearest neighbors 620 can comprise previous feature vectors associated with previous domain name images generated prior to the domain name image generated at 712.

At 718, the siamese neural network 630 can compare the feature vector 601 with the previous feature vector (from feature vectors 620) in order to determine whether the domain name image generated at 712 satisfies a similarity threshold 640 with respect to the previous domain name image, generated at 702. The similarity threshold 640 can optionally be adjusted at any time, resulting in an adjusted similarity threshold 640 for use in subsequent comparisons of feature vectors with previous feature vectors. A reason to adjust the similarity threshold 640 may be, e.g., the available resources for reviewing outputs from operation 720. When a group of nearest neighbor feature vectors is processed at 718, operation 718 can include determining whether the domain name image generated at 712 satisfies a similarity threshold 640 with respect to any of the previous domain name images in the group.

At 720, the homoglyph attack detection service 300 identify the domain name 420 for further review in response to determining that the domain name image generated at 712 satisfies the similarity threshold 640 with respect to the previous domain name image generated at 702.

Figure 8:
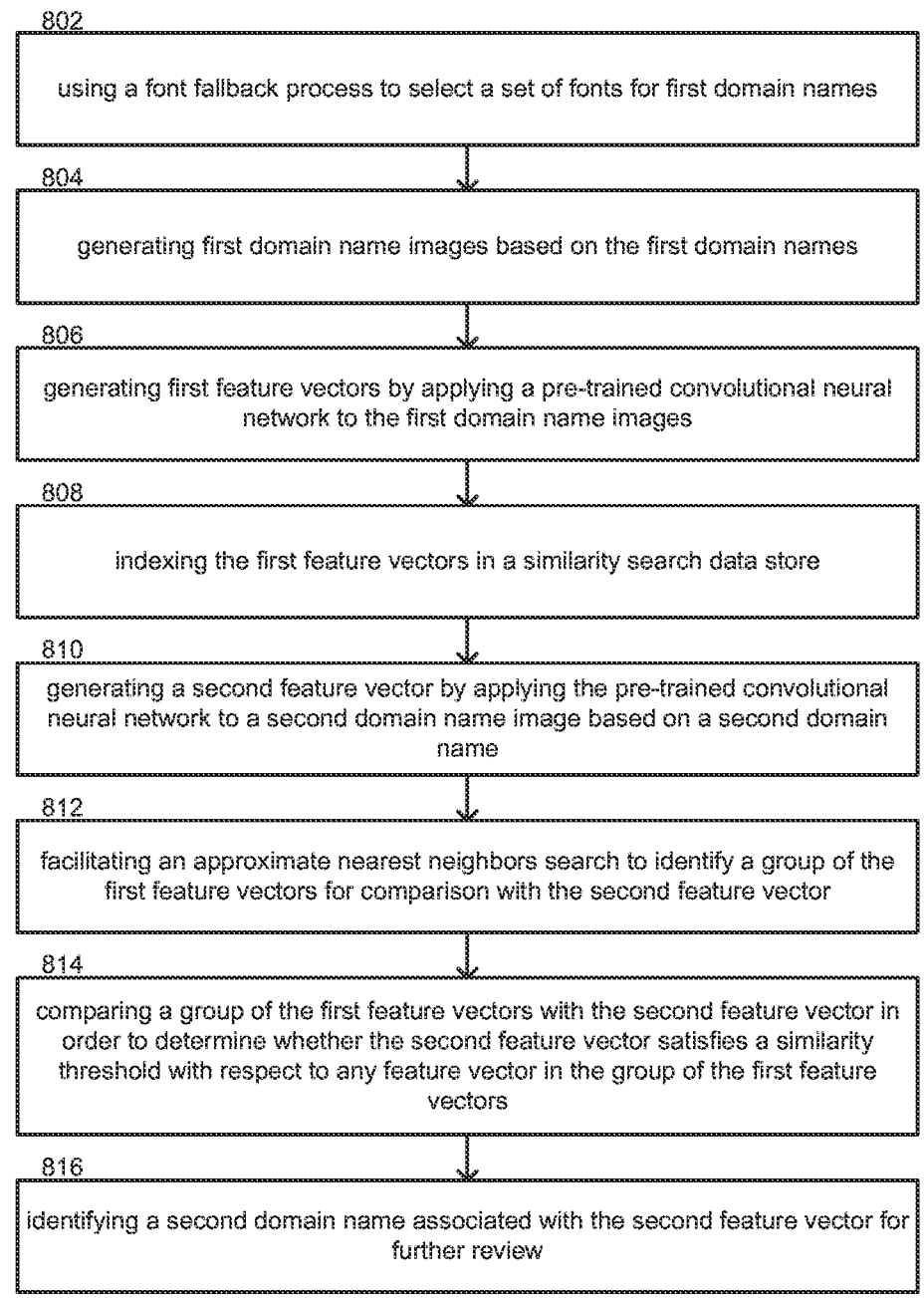
FIG. 8 is a flow diagram representing another set of example operations of a homoglyph attack detection service, in accordance with various aspects and embodiments of the subject disclosure.

FIG. 8 is a flow diagram representing another set of example operations of a homoglyph attack detection service, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by the homoglyph attack detection service 300 illustrated in FIGS. 3-6. Operations 802-808 generally implement phase one 210 illustrated in FIG. 2. At 802, the feature generator 310 illustrated in FIG. 3 can use a font fallback process to select a set of fonts for first domain names, e.g., for protected domain name 112, prior to generating first domain name images. At 804, the feature generator 310 can generate first domain name images based on the first domain names. At 806, the feature generator 310 can generate first feature vectors, e.g., feature vector 320, by applying a pre-trained convolutional neural network 316 to the first domain name images generated at 804.

At 808, the similarity search data store 200 can index the first feature vectors in the similarity search data store 200. The first feature vectors can be indexed for use in connection with approximate nearest neighbor searches. An approximate nearest neighbor search of the approximate nearest neighbor searches can identify nearest neighbors of a second feature vector, e.g., a comparison feature vector 601. The nearest neighbors can comprise a group of the first feature vectors for comparison with the second feature vector 601 in order to determine, e.g., via subsequent operations, whether the second feature vector 601 satisfies a similarity threshold 640 with respect to any feature vector in the group of the first feature vectors.

Operations 810-816 generally implement phase two 220 illustrated in FIG. 2. At 810, the feature generator 310 illustrated in FIG. 5 can generate a second feature vector (e.g., comparison feature vector 601, which can be among comparison feature vectors 510) by applying the pre-trained convolutional neural network 316 to a second domain name image based on a second domain name, e.g., a comparison domain name 420. At 812, the homoglyph attack detection service 300 can facilitate an approximate nearest neighbor search 610 to identify a group of the first feature vectors for comparison with the second feature vector 601, e.g., to identify nearest protected feature vector(s) 620.

At 814, the siamese neural network 630 can compare the group of the first feature vectors 620 with the second feature vector 601 in order to determine whether the second feature vector 601 satisfies a similarity threshold 640 with respect to any feature vector in the group of the first feature vectors 620. At 816, the homoglyph attack detection service 300 can identify a second domain name associated with the second feature vector 601 for further review, e.g., in response to determining that the second feature vector 601 satisfies the similarity threshold 640 with respect to any feature vector in the group of the first feature vectors 620.

Figure 9:
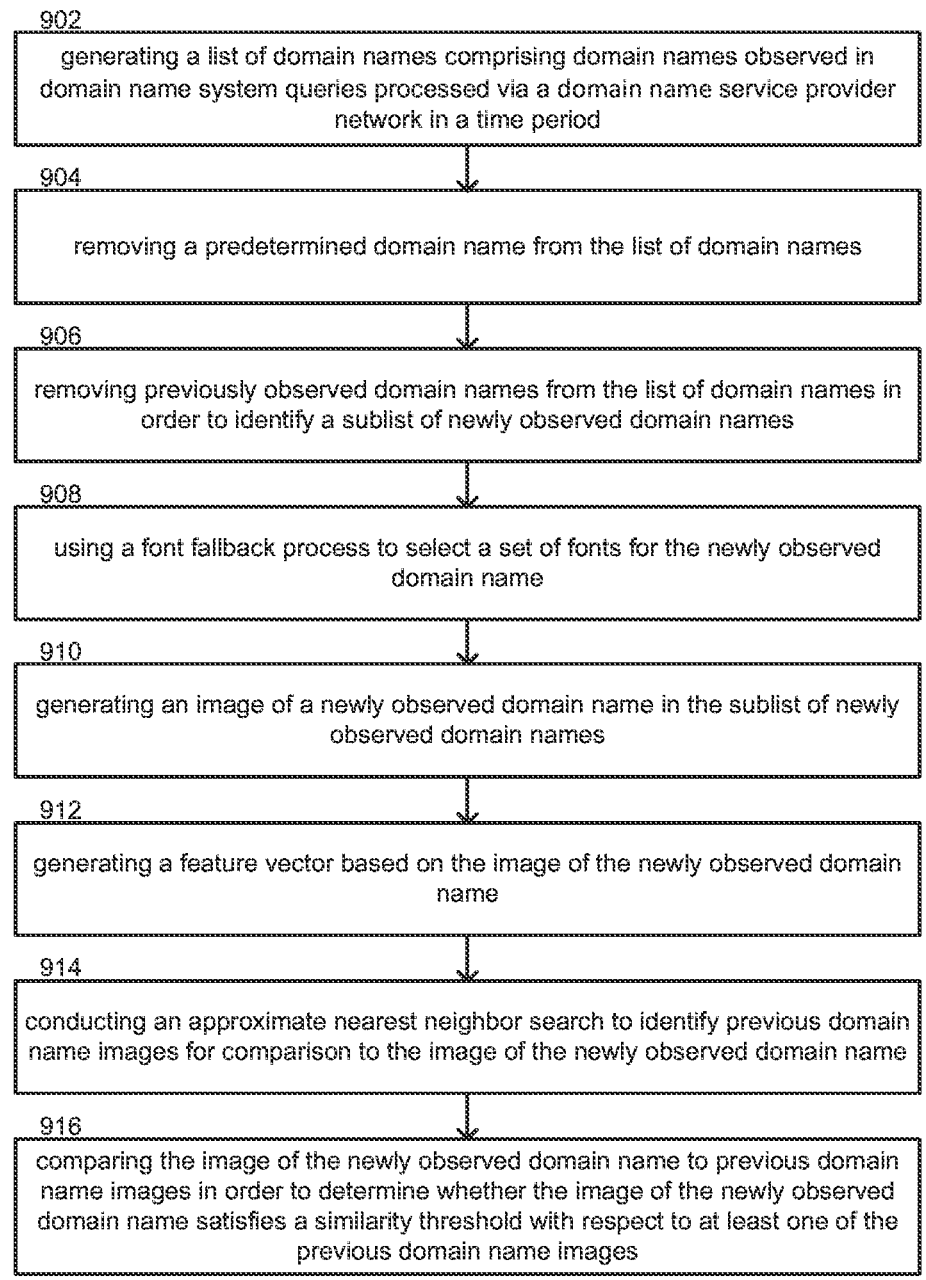
FIG. 9 is a flow diagram representing another set of example operations of a homoglyph attack detection service, in accordance with various aspects and embodiments of the subject disclosure.

FIG. 9 is a flow diagram representing another set of example operations of a homoglyph attack detection service, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by the homoglyph attack detection service 300 illustrated in FIGS. 3-6. Operations 902-906 generally implement obtaining a list of comparison domain names, described in connection with FIG. 4. Operations 902-906 can optionally be implemented outside of homoglyph attack detection service 300, e.g., at DNS server(s) 130, or else within the homoglyph attack detection service 300 based on information obtained from the DNS server(s) 130.

At 902, the computing equipment 400 can generate a list of domain names comprising domain names observed in domain name system queries processed via a domain name service provider network in a time period, e.g., time period 412. In some embodiments, the list of domain names can comprise substantially all domain names observed in domain name system queries processed via the domain name service provider network in the time period 412. At 904, the computing equipment 400 can remove a predetermined domain name from the list of domain names in order to identify a sublist of domain names. The predetermined domain name can be selected from a list of predetermined domain names, e.g., a whitelist of domain names that are always removed from consideration.

At 906, the computing equipment 400 can furthermore remove previously observed domain names from the list/sublist of domain names in order to identify the sublist of newly observed domain names. The previously observed domain names can comprise domain names observed in domain name system queries processed by the domain name service provider prior to the time period 412, as described in connection with FIG. 4. In some embodiments, the previously observed domain names can comprise substantially all domain names observed in domain name system queries processed via the domain name service provider network prior to the time period 412.

Operations 908-916 generally implement phase two 220 illustrated in FIG. 2, and can be performed, for example, by the homoglyph attack detection service 300 illustrated in FIGS. 3-6. At 908, the feature generator 310 illustrated in FIG. 5 can use a font fallback process to select set of fonts for a newly observed domain name in the sublist of newly observed domain names, e.g. fonts can be selected for a comparison domain name among comparison domain names 420. At 910, the feature generator 310 can generate an image of the newly observed domain name in the sublist of newly observed domain names. At 912, the feature generator 310 can generate a feature vector based on the image of the newly observed domain name generated at 908.

At 914, approximate nearest neighbor search 610 can conduct an approximate nearest neighbor search to identify previous domain name images for comparison to the image of the newly observed domain name. The approximate nearest neighbor search can use feature vectors associated with domain name images, as described herein.

At 916, the siamese neural network 630 can compare the image of the newly observed domain name to previous domain name images in order to determine whether the image of the newly observed domain name satisfies a similarity threshold 640 with respect to at least one of the previous domain name images. For example, comparing the image of the newly observed domain name to previous domain name images can comprise comparing the feature vector 601 with feature vectors 620 associated with the previous domain name images. If the result of the comparison is that the similarity threshold is met or exceeded, the homoglyph attack detection service 300 can be configured to flag the associated potentially confusingly similar domain names for further review or action as described herein.

Figure 10:
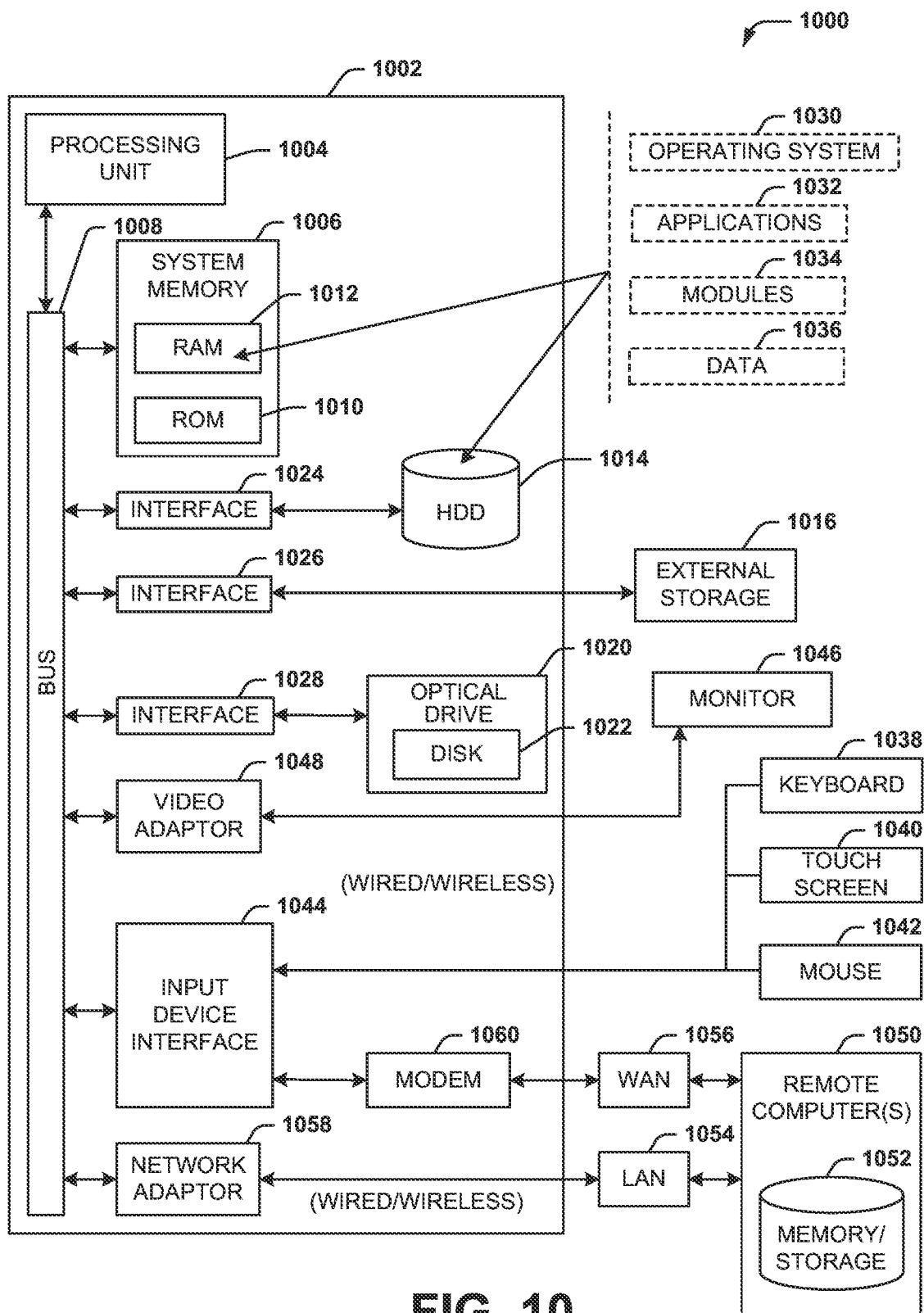
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   generating, by equipment comprising a processor, a domain name image based on a domain name;
   generating, by the equipment, a feature vector, wherein generating the feature vector comprises applying a pre-trained convolutional neural network to the domain name image;
   facilitating, by the equipment, an approximate nearest neighbor search to identify a nearest neighbor associated with the feature vector, wherein the nearest neighbor comprises a previous feature vector associated with a previous domain name image generated prior to the domain name image;
   comparing, by the equipment, the feature vector with the previous feature vector in order to determine whether the domain name image satisfies a similarity threshold with respect to the previous domain name image;

identifying, by the equipment, the domain name for further review in response to determining that the domain name image satisfies the similarity threshold with respect to the previous domain name image; and in response to determining, by the equipment, that the domain name comprises a malicious domain name, providing, by the equipment, a notification to each of a group of communication devices associated with a group of domain name service providers indicating the malicious domain name.

2. The method of claim 1, further comprising:

generating, by the equipment, the previous domain name image based on a previous domain name;

generating, by the equipment, the previous feature vector by applying the pre-trained convolutional neural network to the previous domain name image; and indexing, by the equipment, the previous feature vector in a similarity search data store for use in connection with the approximate nearest neighbor search.

3. The method of claim 1, wherein comparing the domain name image with the previous domain name image comprises using a siamese neural network to compare the domain name image with the previous domain name image.

4. The method of claim 1, wherein:

the approximate nearest neighbor search identifies a group of nearest neighbors associated with the feature vector, the nearest neighbors in the group of nearest neighbors comprise previous feature vectors associated with previous domain name images generated prior to the domain name image, and the method further comprises:

based on the comparing, determining, by the equipment, whether the domain name image satisfies a similarity threshold with respect to any of the previous domain name images.

5. The method of claim 1, further comprising identifying the domain name by processing a list of domain names observed in a time period, wherein processing the list of domain names observed in the time period comprises removing, from the list of domain names observed in the time period, domain names observed prior to the time period.

6. The method of claim 5, wherein the list of domain names observed in the time period comprises at least a portion of all domain names observed in domain name system queries processed via a domain name service provider network in the time period.

7. The method of claim 1, further comprising using, by the equipment, a font fallback process to select a set of fonts for the domain name prior to generating the domain name image.

8. The method of claim 1, further comprising adjusting, by the equipment, the similarity threshold resulting in an adjusted similarity threshold for use in subsequent comparisons of feature vectors with the previous feature vector.

9. Computing equipment, comprising:

a processor; and a memory that stores executable instructions that, when executed by the processor, facilitate performance of operations, comprising:

generating first domain name images based on first domain names;

generating first feature vectors by applying a pre-trained convolutional neural network to the first domain name images;

indexing the first feature vectors in a similarity search data store for use in connection with approximate nearest neighbor searches, wherein an approximate nearest neighbor search of the approximate nearest neighbor searches identifies nearest neighbors of a second feature vector, wherein the nearest neighbors comprise a group of the first feature vectors for comparison with the second feature vector in order to determine the second feature vector satisfies a similarity threshold with respect to any feature vector in the group of the first feature vectors resulting in a determination;

based on the determination, identifying a domain name for further review; and in response to determining that the domain name comprises a malicious domain name, providing a notification to each of a group of communication devices associated with a group of domain name service providers indicating the malicious domain name.

10. The computing equipment of claim 9, wherein the operations further comprise generating the second feature vector by applying the pre-trained convolutional neural network to a second domain name image based on a second domain name.

11. The computing equipment of claim 10, wherein the comparison uses a siamese neural network to compare the second feature vector with feature vectors in the group of the first feature vectors.

12. The computing equipment of claim 10, wherein the operations further comprise identifying a second domain name associated with the second feature vector for further review in response to determining that the second feature vector satisfies the similarity threshold with respect to any feature vector in the group of the first feature vectors.

13. The computing equipment of claim 9, wherein the operations further comprise performing the comparison with the second feature vector in order to determine whether the second feature vector satisfies the similarity threshold with respect to any feature vector in the group of the first feature vectors.

14. The computing equipment of claim 9, wherein the operations further comprise using a font fallback process to select a set of fonts for the first domain names prior to generating the first domain name images.

15. A non-transitory machine-readable medium, comprising executable instructions that, when executed by a processor, facilitate performance of operations, comprising:

generating a list of domain names comprising domain names observed in domain name system queries processed via a domain name service provider network in a time period;

removing previously observed domain names from the list of domain names in order to identify a sublist of newly observed domain names, wherein the previously observed domain names comprise domain names observed in domain name system queries processed by the domain name service provider prior to the time period;

generating an image of a newly observed domain name in the sublist of newly observed domain names;

comparing the image of the newly observed domain name to previous domain name images in order to determine whether the image of the newly observed domain name satisfies a similarity threshold with respect to at least one of the previous domain name images; and based on the comparing, identifying a domain name for further review; and in response to determining that the domain name comprises a malicious domain name, providing a notification to each of a group of communication devices associated with a group of domain name service providers indicating the malicious domain name.

16. The non-transitory machine-readable medium of claim 15, wherein the list of domain names comprises a portion of all domain names observed in domain name system queries processed via the domain name service provider network in the time period, and wherein the previously observed domain names comprise substantially all domain names observed in domain name system queries processed via the domain name service provider network prior to the time period.

17. The non-transitory machine-readable medium of claim 15, wherein the operations further comprise removing a predetermined domain name from the list of domain names in order to identify the sublist of newly observed domain names, and wherein the predetermined domain name is selected from a list of predetermined domain names.

18. The non-transitory machine-readable medium of claim 15, wherein the operations further comprise generating a feature vector based on the image of the newly observed domain name, and wherein comparing the image of the newly observed domain name to previous domain name images comprises comparing the feature vector with feature vectors associated with the previous domain name images.

19. The non-transitory machine-readable medium of claim 15, wherein the operations further comprise conducting an approximate nearest neighbor search to identify the previous domain name images for comparison to the image of the newly observed domain name.

20. The non-transitory machine-readable medium of claim 15, wherein the operations further comprise using a font fallback process to select a set of fonts for the newly observed domain name prior to generating the image of the newly observed domain name.

* * * * *